US012455157B2

(12) United States Patent
Pruß et al.

(10) Patent No.: US 12,455,157 B2
(45) Date of Patent: Oct. 28, 2025

(54) SINGLE FRAME-TILTED WAVE INTERFEROMETER

(71) Applicant: Universität Stuttgart, Stuttgart (DE)

(72) Inventors: Christof Pruß, Ostfildern (DE); Christian Schober, Ilsfeld (DE)

(73) Assignee: UNIVERSITÄT STUTTGART, Stuttgart (DE)

(*) Notice: Subject to any disclaimer, the term of this patent is extended or adjusted under 35 U.S.C. 154(b) by 259 days.

(21) Appl. No.: 18/037,819

(22) PCT Filed: Nov. 22, 2021

(86) PCT No.: PCT/EP2021/082534
§ 371 (c)(1),
(2) Date: May 19, 2023

(87) PCT Pub. No.: WO2022/106694
PCT Pub. Date: May 27, 2022

(65) Prior Publication Data
US 2024/0003672 A1    Jan. 4, 2024

(30) Foreign Application Priority Data
Nov. 20, 2020  (DE) .................. 10 2020 130 814.0

(51) Int. Cl.
*G01B 9/02001* (2022.01)
*G01B 9/02* (2022.01)
*G01B 9/02015* (2022.01)
*G01M 11/00* (2006.01)

(52) U.S. Cl.
CPC ..... *G01B 9/02007* (2013.01); *G01B 9/02027* (2013.01); *G01B 9/02032* (2013.01);
(Continued)

(58) Field of Classification Search
CPC ............ G01B 9/02007; G01B 9/02027; G01B 9/02032; G01B 9/02039; G01B 2290/50;
(Continued)

(56) References Cited

U.S. PATENT DOCUMENTS 6,304,330 B1    10/2001  Millerd et al.
6,552,808 B2    4/2003   Millerd et al.
(Continued)

FOREIGN PATENT DOCUMENTS

DE  10 2015 222 366 A1      5/2017
WO  WO-2005/052502 A2       6/2005
WO  WO-2019212959 A1 *     11/2019  ......... G01B 11/2441

OTHER PUBLICATIONS

Garbusi, E., et al.; "Interferometere for precise and flexible asphere testing", Optics Letters, Optical Society of America, US, vol. 33, No. 24, Dec. 15, 2008, pp. 2973-2975.
(Continued)

*Primary Examiner* — Michael A Lyons
(74) *Attorney, Agent, or Firm* — Harness, Dickey & Pierce, P.L.C.

(57) ABSTRACT

An interferometer for the measurement of a surface or an optical thickness of an optically smooth test object is provided, wherein the interferometer is configured to illuminate the optically smooth test object simultaneously with a plurality of object waves, which have different wavelengths from one another, and to superimpose the object waves deformed by the illuminated test object onto coherent reference waves on an image capture device, and to spectrally decompose the interferograms resulting from the superposition into wavelength-specific partial interferograms.

10 Claims, 12 Drawing Sheets

(52) U.S. Cl.
CPC ....... *G01M 11/005* (2013.01); *G01B 9/02039* (2013.01); *G01B 2290/50* (2013.01)

(58) Field of Classification Search
CPC ........... G01B 11/0675; G01B 11/2441; G01M 11/005
See application file for complete search history.

(56) References Cited

U.S. PATENT DOCUMENTS

| | | | |
|---|---|---|---|
| 7,230,717 | B2 | 6/2007 | Brock et al. |
| 7,777,895 | B2 | 8/2010 | Medower et al. |
| 12,203,752 | B2 * | 1/2025 | Liang .................. G02B 27/283 |
| 2005/0046865 | A1 | 3/2005 | Brock et al. |
| 2013/0113925 | A1 | 5/2013 | Kim et al. |
| 2018/0328711 | A1 | 11/2018 | Baer et al. |
| 2022/0268569 | A1 * | 8/2022 | Srocka ................ G01N 21/8806 |
| 2023/0332885 | A1 * | 10/2023 | Petitgrand .......... G01M 11/0271 |

OTHER PUBLICATIONS

Beisswanger, R., et al.; "Tiled wave interferometer in common path configuration challenges and realization", Spie Proceedings; Proceedings of SPIE Issn 0277-786X, SPIE, US, vol. 11056, Jun. 21, 2019, pp. 110561G-110561G.

Ines, Fortmeier., et al.; "Evaluation of absolute form measurements using a tilted-wave interferometer", Optics Express, US, vol. 24, No. 4, Feb. 22, 2016, p. 3393.

Andreas Pfortner, et al.; "Red-Green-Blue Interferometer of the Metrology of Discontinuous Structures", Applied Optics, vol. 42, No. 4, Jan. 1, 2003, pp. 667.

Katsuichi Kitagawa, "Multi-wavelength single-shot interferometry", 2009, International Symposium on Optomechatronic Technologies (ISOT 2009), Istanbul, Turkey, Sep. 21-23, 2009, IEEE, Piscataway NJ USA, Sep. 21, 2009, pp. 34-39.

Tian Xiaobo, et al.; "Snapshot multi-wavelength interference microscope", Optics Express, vol. 26, No. 14, Jul. 2, 2018, p. 18279.

Li Jia, et al.; "New technique for generating light source array in tilted wave interfeometer" Proceedings of SPIE: SPIE, US, vol. 10329, Jun. 26, 2017, pp. 1032928-1032928.

Office Action from corresponding German Patent Application No. 10 2020 130 814.0, dated Sep. 6, 2021.

International Search Report from corresponding PCT Application No. PCT/EP2021/082534, dated Feb. 22, 2022.

Written Opinion from corresponding PCT Application No. PCT/EP2021/082534, dated Feb. 22, 2022.

* cited by examiner

- Prior Art -

- Prior Art -

SINGLE FRAME-TILTED WAVE INTERFEROMETER

CROSS-REFERENCE TO RELATED APPLICATIONS

This application is a national phase application of PCT Application No. PCT/EP2021/082534, filed on 22 Nov. 2021, which claims the benefit of and priority to German Patent Application No. 10 2020 130 814.0, filed on 20 Nov. 2020. The entire disclosures of the applications identified in this paragraph are incorporated herein by references.

The present invention relates to an interferometer and to a method for areal measuring a surface or an optical thickness of an optically smooth test object. Interferometers are useful for measuring optical surfaces, and are accurate and fast measuring devices. Interferometers make use of the wave characteristic of light. When a known reference wave is superimposed on an object wave which is coherent thereto and which is typically deformed by the surface of a test object, regions with extinction and regions with light amplification arise. The resulting intensity image, the interferogram, contains information about the deviation of the test object from the desired shape, and can be evaluated.

The known interferometer, which in one embodiment, for example, is described in [Garbusi, Eugenio; Pruss, Christof; Osten, Wolfgang: "Interferometer for precise and flexible asphere testing" in Optics letters, 33, 2973-5 (2009), 10.1364/OL.33.002973], is used for the areal measurement of a surface or of the optical thickness of an optically smooth component, wherein the interferometer is configured to illuminate the optically smooth test object with a plurality of illumination configurations, and to superimpose the object waves—which are altered by reflection from the test object at the surface being measured or by transmission through the test object—onto reference waves that are coherent with the object waves, on at least one image capture device (K), to produce an interferogram.

As a result, each illumination configuration is the totality of the object waves with which the test object is simultaneously illuminated. Each object wave is preferably emanating from a light-emitting point light source. Therefore, an illumination configuration can also be understood as the totality of light-emitting point light sources from which said object waves emanate. An optically smooth surface is understood to mean a reflective surface.

The increasing use of aspherical or freeform surfaces in the field of optical design allows for optics systems with higher imaging quality and more compact dimensions, but at the same time requires a measurement technique for the production process which can accompany the production. The production of optics with the aforementioned precision requirements is only possible if the production machines obtain feedback from the measurement technology, such that the subsequent correction step can take place in a targeted manner. In the field of final quality control as well—for example, in the case of replicated optics—a surface measurement must confirm the quality of the optics, and deviations in the manufacturing process must be detected as early as possible. Rapid, flexible and nevertheless highly accurate measurement technology is necessary for this feedback.

Previous solutions can be divided into scanning and areal measuring systems. The scanning systems measure the test object point by point (e.g., tactile or optical coordinate measuring machines) or in individual small area regions which are subsequently combined by calculation (e.g., Zygo Verifire Asphere scanning interferometer, QED SSiA stitching interferometer).

Due to the intrinsically sequential approach, a stable measurement environment is a requirement, and the measuring process lasts for many minutes—up to a few hours. An integration into the production is made more difficult as a result; a 100% test rate with high quantities (for example, injection molding of precision optics) is impossible.

So-called null lenses have high potential for fast measurement technology applications. These are lenses which are recalculated and manufactured for each new type of aspheric or freeform surface, which adapt the wavefront of the interferometer to the specific test object. However, the potential speed advantage is bought by the high cost and long delivery times for the null lenses.

A flexible interferometric measurement technology which can be used to measure aspheric and freeform lenses quickly and with low measurement uncertainty is the tilted wave interferometer (TWI) invented at the Institut für Technische Optik.

The TWI achieves a measurement of the test object in a time of less than one minute by means of a special illumination and a comprehensive detection and computational elimination of system errors of the instrument, without having to use complex null lenses.

The measurement of the dimensional accuracy of optical components requires a resolution in the range of fractions of the wavelength A used (e.g., A/100, where A is, e.g., in the visible region: 400 to 800 nm). As such, this means a resolution in the range of single-digit nanometers). This can be regarded as a solved problem for applications involving spherical or planar surfaces, due to the use of interferometers which measure surface in an aeral manner.

In contrast to the measurement of spherical and planar surfaces, the interferometric measurement of aspherical surfaces, however, represents a problem in the field of optical measurement technology that is still not satisfactorily addressed in many sectors. The origin of these problems is that null tests on aspheres always require the production of special refractive or diffractive lenses as null lenses adapted to the asphere.

It is already possible to produce standardized refractive and diffractive null lenses for aspheres; a diffractive structure is used to shape the spherical object wave of an interferometer lens in such a way that a wave adapted to the test object is produced. Since aspheres are produced in an enormous variety of forms, the generation of adapted null lenses is associated with a great expenditure of time and costs.

None of the solutions of the prior art is capable of measuring an asphere or freeform surface in only one camera exposure. Many sequential individual measurements must be captured, which makes the known methods vulnerable to environmental influences. Only the measurement with null lenses would have the potential for measuring in a single camera exposure period; however, because of the individual null lenses, this approach is too complicated and expensive for many applications.

It is known that interferograms which arise due to the superposition of two wavefronts can be evaluated by different methods, i.e., the phase difference between the two wavefronts, referred to below for short as phase, can be determined from the intensity distributions that can be registered with a camera. In interferometry, this phase carries the information about the test object, which is why its determination is necessary for any interferometric measurement technique. The known methods for determining the phase include the very widespread phase shift method in which a plurality of camera images must be captured. However, methods are also known in which the phase can be determined from only one camera image.

From the abstract of WO2005052502A2, a phase difference sensor is known that measures a spatially resolved phase difference between orthogonally polarized reference and test wavefronts. The sensor is constructed as a pixelated phase mask which is aligned with a pixelated detector array and is imaged thereon. Each adjacent pixel of the phase mask measures a predetermined relative phase shift between the circularly orthogonally polarized reference and test beams. As such, a plurality of phase-shifted interferograms can be synthesized simultaneously by combining pixels having identical phase shifts. The multi-phase-shifted interferograms should be able to be combined in order to calculate the phase difference between the reference wavefront and test wavefront. Any configuration of an interferometer that generates orthogonally polarized reference and object beams can be combined with the phase difference sensor to provide single-shot measurements for a simultaneous phase shift.

A further method with which the phase can be determined from only one camera image is the so-called carrier frequency method, in which the phase can be obtained according to the principle of sideband modulation, see, for example, [Mitsuo Takeda, Hideki Ina, and Seiji Kobayashi, "Fourier-transform method of fringe-pattern analysis for computer-based topography and interferometry," J. Opt. Soc. Am. 72, 156-160 (1982)].

The fastest flexible method to-date, which is TWI, typically requires four phase measurements in different illumination distributions, each of which requires 5 camera captures.

The publication [X. Tian, et. al "Snapshot multi-wavelength interference microscope, Opt. Express 26, 18279-18291 (2018), DOI: 10.1364/OE.26.018279] discloses a single-image multi-wavelength interferometer for the areal measurement of a surface, in which the surface is illuminated with light of different colors incident from the same directions, and in which the light emitted by the surface is decomposed in wavelength-indexed partial interferograms. Tian et al. thus achieve an approach in which the information about the phase of all three wavelengths necessary for multi-wave interferometry is available simultaneously in each pixel.

Against this background, the object of the invention is to specify a method and a measuring device of the types mentioned at the outset with which optical surfaces can be measured precisely with reduced expenditure of time without null lenses.

The interferometer according to the invention is characterized in that each illumination configuration is realized by a separate color channel and/or by object waves having wavelengths of a continuous wavelength region with a central wavelength which is specific to the wavelength region, wherein a first of the illumination configurations has only object waves of a wavelength region having a first central wavelength, and wherein a second of the illumination configurations has only object waves of a wavelength region having a second central wavelength, and wherein a third of the illumination configurations has only object waves of a wavelength region having a third central wavelength, wherein the first central wavelength is different from the second central wavelength, wherein the third central wavelength is different from the first central wavelength and from the second central wavelength, and wherein the interferometer is configured to illuminate the test object simultaneously with object waves of the first illumination configuration and the second illumination configuration and the third illumination configuration from discretely different (that is, non-parallel) directions, and, following an interaction with the test object, to superimpose object waves returning therefrom on the image capture device, and wherein the image capture device is configured to spectrally decompose the interferograms produced by the superposition into wavelength-specific partial interferograms.

By means of the invention, the chronologically sequential switching from one illumination configuration to the next which was previously used is made parallel in time by the use of spectral information.

Each illumination configuration is realized by a separate color channel and/or a separate central wavelength. This means that the construction is not only illuminated by a light source, but by, for example, three or four laser light sources of different wavelengths. The invention allows precision optics such as aspheric and freeform surfaces being measured in a very short time with low measurement uncertainty. It is thus possible to integrate the measuring process necessary for the production of the optics into the production, which can greatly increase productivity by saving the testing logistics and measuring time. By detecting the entire test object topography in one exposure, the influence of unstable environmental conditions is reduced to a minimum. New measurement approaches such as the measurement of moving test objects are made possible. The single-frame TWI measurement technique enables the interferometric measurement of variable test objects, for example moving test objects in series production. Shape-variable test objects such as, for example, the cornea, vibrating surfaces, or the dynamic behavior of astronomy mirrors can also be measured with a high measurement accuracy with the single-frame TWI measurement technology according to the invention.

The ability to flexibly measure highly aspheric and freeform surfaces in only one exposure, without the use of special null lenses, is novel. The invention makes it possible to replace the sequential changes in the illumination configuration necessary for the TWI with a parallel, wavelength-separated illumination scheme, which at the same time enables phase evaluation methods based on individual images.

It is also preferred that a fourth of the illumination configurations has only object waves of a wavelength region having a fourth central wavelength, wherein the fourth central wavelength is different from the first central wavelength, the second central wavelength and the third central wavelength, and wherein the interferometer is configured to illuminate the test object simultaneously with object waves of the first illumination configuration and the second illumination configuration and the third illumination configuration and the fourth illumination configuration from discretely different directions and, following an interaction with the test object, to superimpose object waves returning therefrom on the image capture device, and wherein the image capture device is configured to spectrally decompose the interferograms produced by the superposition into wavelength-specific partial interferograms.

A further preferred embodiment is characterized in that the interferometer is configured to illuminate the optically smooth component simultaneously with the first illumination configuration and the second illumination configuration, or simultaneously with the first illumination configuration and the second illumination configuration and the third illumination configuration, or simultaneously with the four illumination configuration. Each illumination configuration may have an object wave or a group of object waves, wherein the group may also have up to several hundred object waves.

It is preferably provided that object waves propagate in closest adjacent directions—i.e., they originate, for example, from two point light sources arranged next to one another, and do not contain wavelengths from the same wavelength region. In principle, configurations are also conceivable in which the point light sources are virtual point light sources.

It is further preferred that the interferometer is configured to separate interferograms using suitable color filters such that each pixel of the camera detector(s) substantially detects only the interferogram information from only one wavelength region.

It is preferably provided that the object waves originate from point light sources.

A further preferred embodiment is characterized in that the point light sources are arranged in such a way that each light source is arranged in the center of an imaginary regular hexagon, wherein the hexagons are adjacent to one another without gaps in one plane, and in such a way that hexagons, in the center of which a light source is arranged which emits light of a central wavelength or with wavelengths from one of the wavelength regions with a central wavelength, is only adjacent to hexagons in the center of which light of a different wavelength or wavelengths of another of the wavelength regions is arranged.

It is also preferred that the point light sources are arranged in such a way that each light source is arranged in the center of an imaginary regular square, wherein the squares are adjacent to one another without gaps in one plane, and wherein squares, in the center of which a light source is arranged which emits light of a central wavelength or with wavelengths from one of the wavelength regions, is only adjacent to squares in the center of which a light of another wavelength or light of another wavelength region is arranged.

Furthermore, it is preferred that the detector, in addition to color filters, additionally has polarization filters on its individual pixels, with pixel-wise different orientations.

A further preferred embodiment is characterized in that the plurality of point light sources for each central wavelength and/or for each of the wavelength regions and/or for each color channel is an arrangement of a coherent laser source, a Keplerian telescope, and a point light source array, which consists of a transparent substrate, for example a glass substrate, wherein there are micro-lenses on the light entry side thereof facing the telescope, and the focal point thereof is in the plane of a light exit side of the substrate, where an aperture array is located, from which object waves of one of the wavelength regions are emitted. The micro-lenses can, for example, be designed to be refractive, that is to say with a continuous surface, or diffractive, that is to say as Fresnel zone plates, or as a mixed design of these embodiments.

It is also preferred that the plurality of point light sources for each central wavelength and/or for each of the wavelength regions have an arrangement of optical fiber ends coupled by one or more optical couplers to a laser source which emits light of the central wavelength.

Further advantages are found in the description and the accompanying figures.

It should be understood that the features mentioned above and those still to be explained below can be used not only in the respectively specified combinations but also in other combinations, or alone, without departing from the scope of the present invention.

BRIEF DESCRIPTION OF DRAWINGS

Embodiments of the invention are shown in the drawings and explained in more detail in the following description. The figures show the following in a schematic form:

FIG. 1 shows in detail an interferometer operating with tilted wavefronts. The light of a coherent laser source L, which has only one central wavelength (defined as the wavelength of a narrow wavelength region which has the greatest intensity), is divided by a polarizing first beam splitter ST1 into a test beam path and a reference beam path. The light in the test beam path is expanded by a Keplerian telescope, consisting of a first microscope objective M1 and a collimation lens L1, and illuminates the point light source array PLQA. The PLQA consists of a quartz glass substrate, wherein diffractive micro-lenses are located on the light entry side thereof facing the collimating lens. The focal point of the micro-lenses lies in the plane of the substrate rear side forming a light exit side, on which chromium is vapor-deposited. The chromium layer has a spatial filter aperture corresponding to each micro-lens which removes undesired diffraction orders of the micro-lenses and serves as a spatial filter for the wavefronts. In addition, behind the PLQA, there is a pinhole array AA that can be displaced relative to the PLQA and that transmits only the light of each fourth micro-lens.

FIG. 2 schematically shows a plan view of a light exit side of the point light source array, with point light sources arranged in rows and columns, each of which has one of the micro-lenses and one aperture of the pinhole array. The number of pinhole apertures is one-fourth the number of micro-lenses.

The rows and columns are arranged at right angles to one another. The pinhole array covers every other point light source. By moving the pinhole array parallel to the rows and columns, four point light source configurations can be formed. As such, four illumination configurations inclined relative to one another can be generated.

Figure 3:
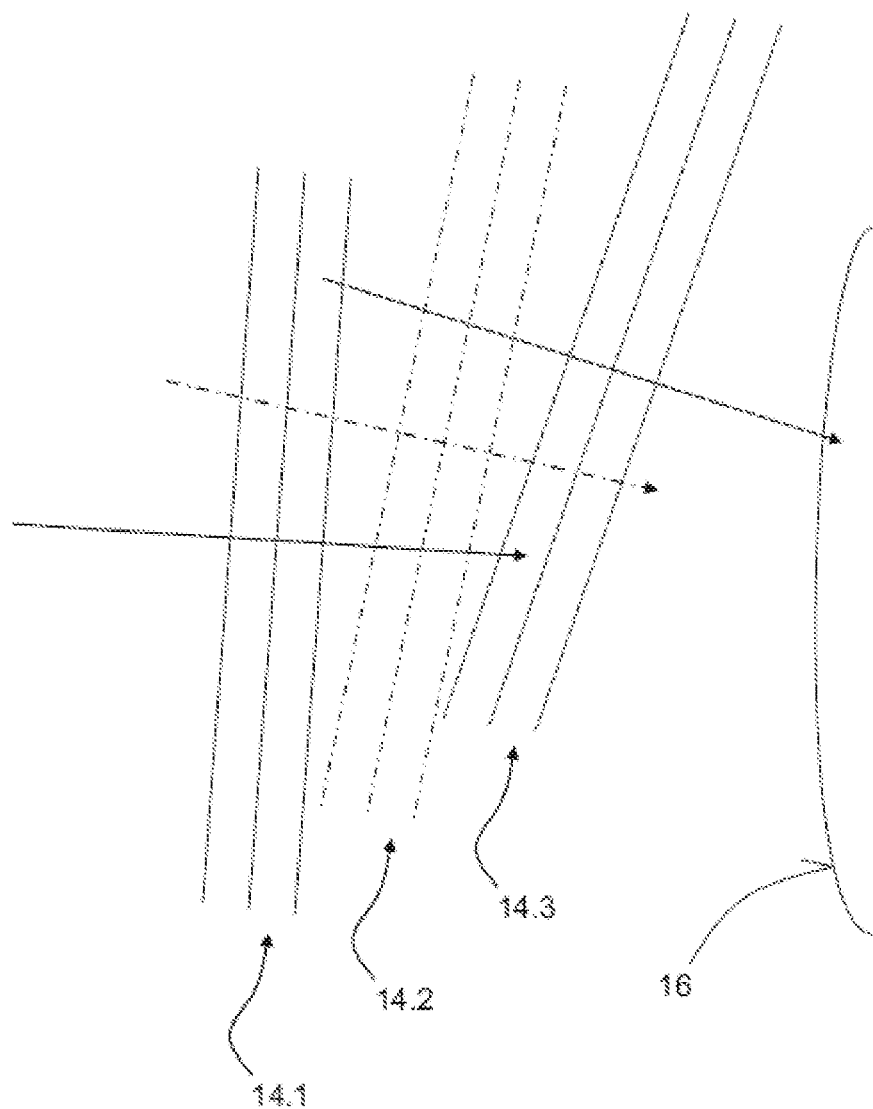
FIG. 3 shows three object wave fronts inclined relative to one another, arriving at an optically smooth surface.

FIG. 3 shows, as an example, three wave fronts 14.1, 14.2, 14.3—inclined relative to one another—of object waves arriving at an optically smooth surface.

Figure 1:
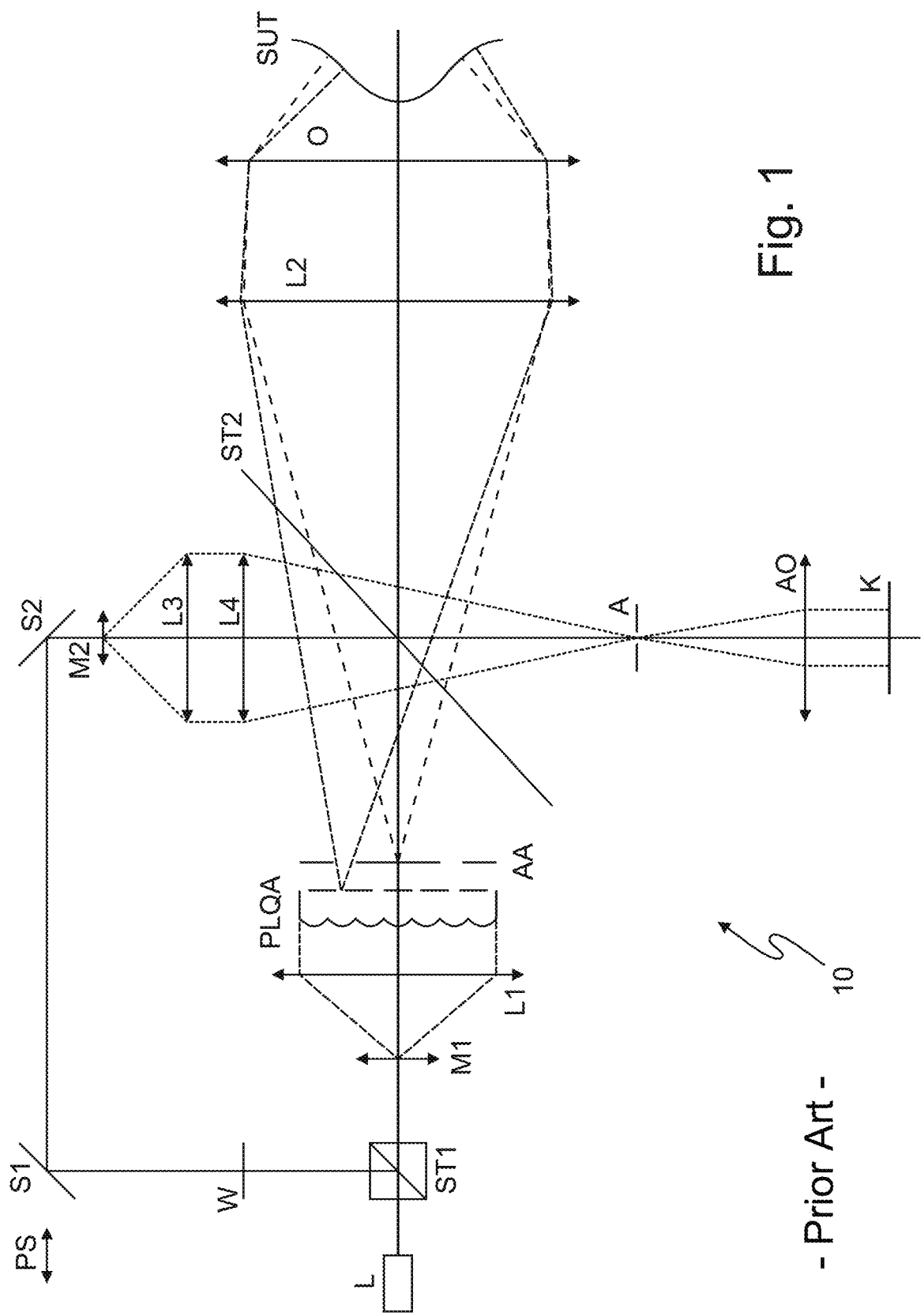
FIG. 1 shows an example of an embodiment of a known interferometer.
Figure 2:
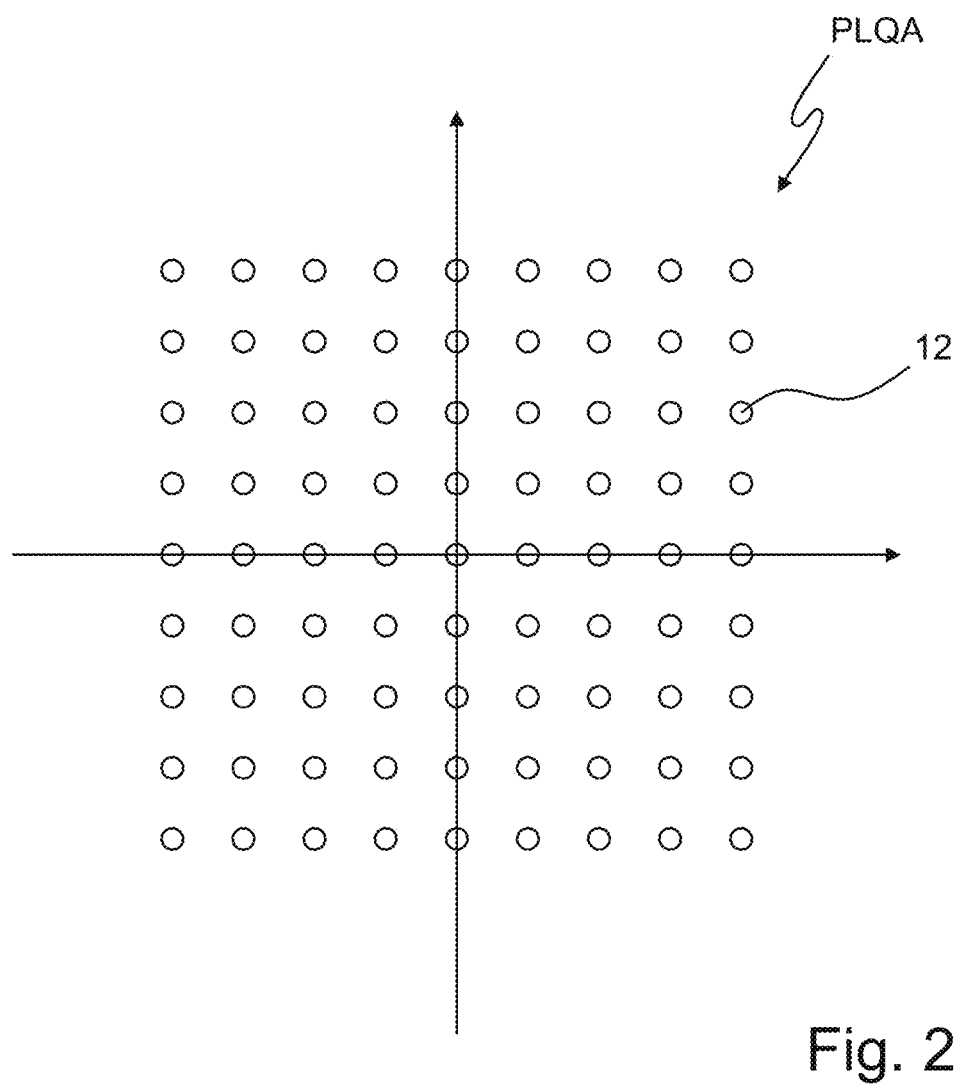
FIG. 2 shows a light exit side of a point light source array with point light sources arranged in rows and columns.

FIG. 1 further shows that light emanating from the point light sources passes through a second beam splitter ST2 and is collimated by means of a collimating lens L2, thereby creating an array of wavefronts of the object waves with different tilting.

The wavefronts of the object waves are transformed through the interferometer objective O into spherical wavefronts in order to compensate for the basic curvature of the test object SUT. After the reflection on the test object SUT, the wavefronts propagate back to the second beam splitter ST2, by which they are reflected into an image capture beam path. An aperture A with a square opening is positioned in the Fourier plane of the interferometer 10, and masks out all areas of wavefronts with a fringe density that would exceed the Nyquist frequency of an image capture device K (e.g., a camera). After the aperture A, the light passes through the imaging optics AO and arrives at the image capture device K.

In the reference beam path, the polarization of the light after exit from the polarizing first beam splitter ST1 is rotated by the Lambda/2 platelet W by $\pi$, such that the polarization of the reference wave matches the polarization of the object waves (test waves) reflected on the test object SUT. The beam is deflected by means of two mirrors S1, S2, wherein one of the mirrors is mounted on a piezo actuator PS in order to be able to evaluate the wavefronts by means of phase shifting methods. The light is expanded by a Keplerian telescope, consisting of a second microscope objective M2 and a lens L3, and subsequently transformed by a lens L4 into a spherical wavefront. The focus of the reference wavefront is located in the center of the aperture A. Subsequently, the light passes through the imaging optics AO and arrives at the image capture device K, in the plane of which it interferes with the light of the test wavefronts.

Each point light source usually generates a measuring range in the form of a small interferogram ("patch") on the image capture device K. The pinhole array AA is shifted four times for a complete measurement. In each of the four positions, a partial measurement is carried out by determining the phase, i.e., a phase difference between object waves and reference waves caused in the region of the patches by different optical path lengths of the object waves and the reference waves, by means of phase-shifting interferometry (PSI).

The distance between the light sources 12 in the PLQA is selected such that rays arrive at the image capture device over all the points of the test object surface which lie within the numerical aperture NA of the interferometer objective O, and the areas of the image capture device which are covered by adjacent point light sources overlap slightly. This ensures that information about the entire surface of the test object is contained in a measurement.

The four partial measurements are subsequently calculated to produce the entire measurement result. The reason for the division into four partial measurements is to avoid the superimposition of the individual regions of the different point light sources—the so-called patches of a partial measurement. Only in this way can the interferograms of the partial measurements be evaluated with low measurement uncertainty.

Each illumination configuration (point light source configuration) generates either no, one, or more patches, depending on the form of the test object. The exact distribution of the patches depends on the shape of the test object, its position, and the interferometer design used.

However, it is not possible to evaluate these overlapping regions using standard methods of interferometry, since the resulting interferograms no longer arise from two wavefronts, but rather multiple-beam interference occurs.

Figure 4A:
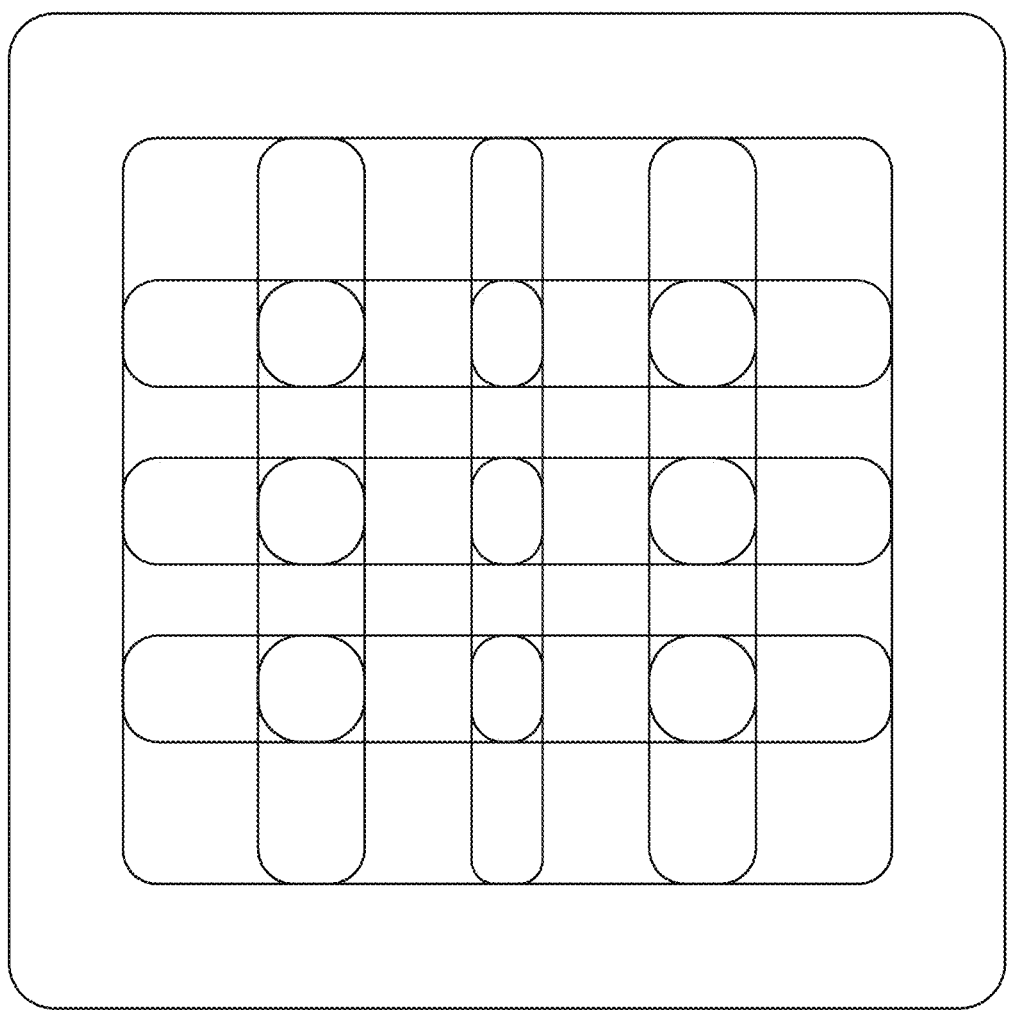
FIG. 4a shows outlines of an interferogram, which has been captured with four point light sources per line and per column, wherein all point light sources were switched on simultaneously.

FIG. 4 *a* schematically shows an interferogram on the image capture device K which has been captured with four point light sources per line and per column, wherein all point light sources were simultaneously switched on. Then, the interferogram patches generated with light of the individual point light sources overlap. In the shaded overlap regions, the interferograms cannot be evaluated.

Figure 4B:
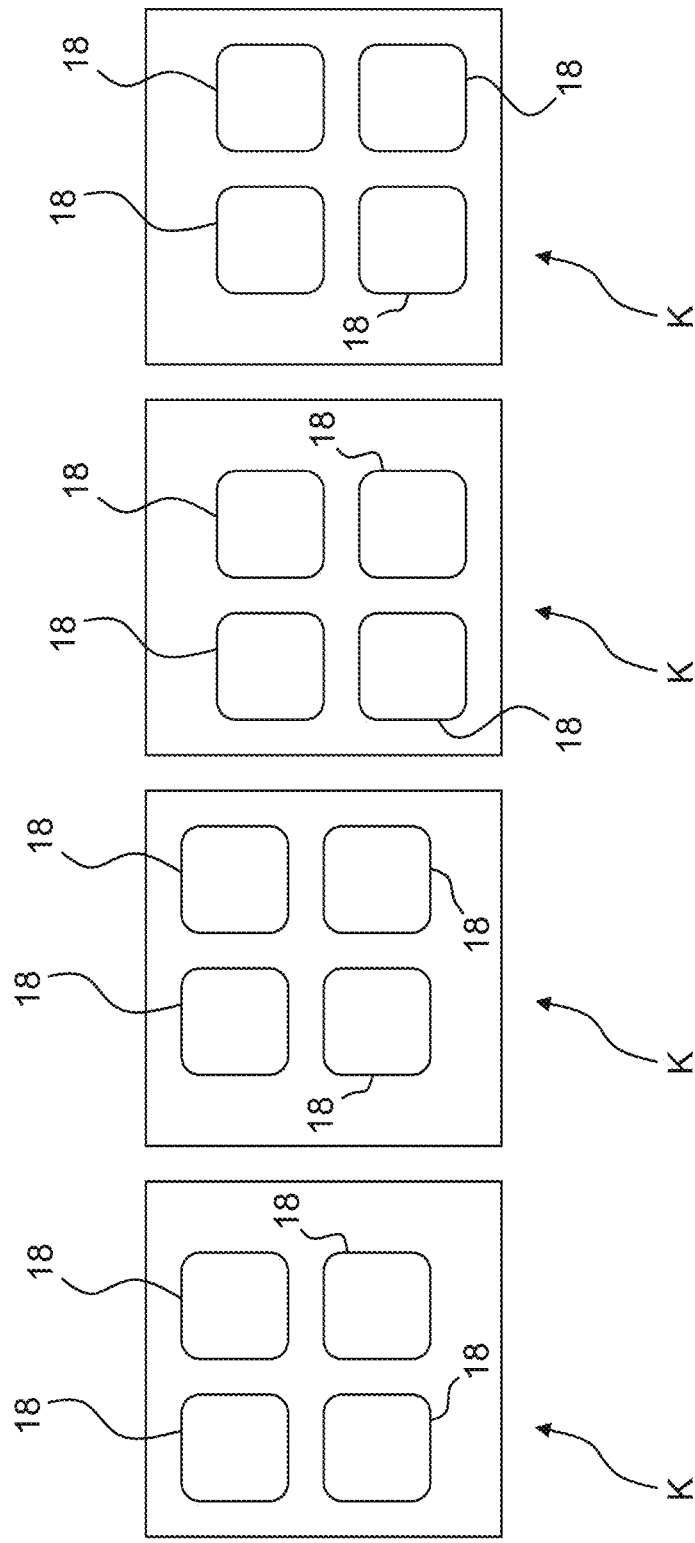
FIG. 4b shows four patterns of interferogram patches captured with the same interferometer, resulting in a chronologically sequential capture.

FIG. 4 *b* shows four patterns of interferogram patches 18 captured with the same interferometer, which are produced only when every other point light source is switched on for four different illumination configurations. These patterns have been captured sequentially, in each case one at a time. An example of an illumination configuration is produced, for example, if only the even-numbered point light sources are switched on in each row and in each column of a Cartesian arrangement of point light sources (other configurations: even-numbered point light sources in lines in conjunction with odd-numbered point light sources in columns switched on; odd-numbered point light sources in lines in conjunction with even point light sources in columns switched on; odd-numbered point light sources in lines in conjunction with odd-numbered point light sources switched on). The patches 18 are then not superimposed and are therefore evaluable. The pattern of FIG. 4 *a* is produced when the patches 18 of FIG. 1 *b* are all placed on top of one another, or when all point light sources 18 with which the patches 18 of FIG. 4*b* are generated simultaneously contribute to the exposure of the image capture device.

From the four phase measurements, the shape deviation of the test object SUT from its nominal shape can be determined. Since it is necessary, in contrast to the above-mentioned carrier frequency method, which allows phase measurement with only one image, to capture at least three image captures for a phase measurement (typically 5 or more) for phase shift interferometry, and thus at least 12, or more reasonably 20 camera images, which are necessarily captured sequentially, are required for a complete measurement, a measurement time period which lies in the range of a half minute has hitherto been required. In this time period, unstable environmental conditions such as vibrations, drifts and air turbulences can falsify the measurement result.

In the approach according to the invention, instead of the sequential capture of interferograms generated in each case with a single central wavelength, a single capture of a camera image with object waves which have different wavelengths from one another and thus produce different interferograms from one another, which can be separated from one another by wavelength-dependent filtering, takes place.

Specifically, the interferometer according to the invention is characterized in that a first of the object waves propagating in a first of the discretely different directions has a first central wavelength, and that a second of the object waves propagating in a second of the discretely different directions has a second central wavelength, and that a third of the object waves propagating in a third of the discretely different directions has a third central wavelength, and that the interferometer is configured to illuminate the optically smooth component simultaneously with the first object wave and the second object wave and the third object wave, or simultaneously with the four object waves. This illumination configuration results, for example, in FIG. 3 with the three object waves 14.1, 14.2, 14.3 as the first, second and third object waves, wherein these object waves have different wavelengths from one another.

The basic idea of the invention is thus to parallelize the sequential selection of the illumination configurations through the use of spectral information, and thus to replace the non-parallel capture of a plurality of illumination configurations with one single capture.

In the interferometer according to the invention, each illumination configuration is realized by a separate color channel and/or by a wavelength region having a central wavelength. The colors or the wavelengths are separated from the other illumination configurations/wavelengths at the image capture device K by wavelength-selective filters.

In this case, an illumination configuration is not limited to one object wave; rather, it can contain a plurality of object wave fronts which are discretely inclined relative to one another. Wavefronts tilted in discretely different directions are associated with wave normals, as propagation directions, which are not parallel to one another. These object waves illuminate the test object under discretely different angles, or from discretely different and thus non-parallel directions. This means that one or more wavefronts arrive at each point of the test object being measured, and their propagation directions differ.

This means that the interferometer, with exposures at one point in time, is illuminated not only by an illumination configuration and/or an object wave having a central wavelength, but simultaneously by, for example, three or four object waves of different wavelengths.

Each of the laser light sources is integrated into the configuration in such a way that its light illuminates the test object at angles which are different from the other laser light sources. This results in wavefronts as shown in FIG. 3, which belong to object waves with different wavelengths/colors. The desired result is that colored, overlapping interferogram patches are generated on the image capture device.

The image capture device K is preferably designed such that it can assign the resulting interferograms to its wavelength by means of spatially resolved wavelength selection. The interfering superpositions can be resolved in this way. An example of such an image capture device is produced by Sony and advertised under the name "Polysens".

For this purpose, it is necessary for the illumination angles of the individual illumination configurations to be selected such that no adjacent interferogram patches 18 have the same color/wavelength—since otherwise, interfering superposition regions with the same wavelength would arise.

Figure 5:
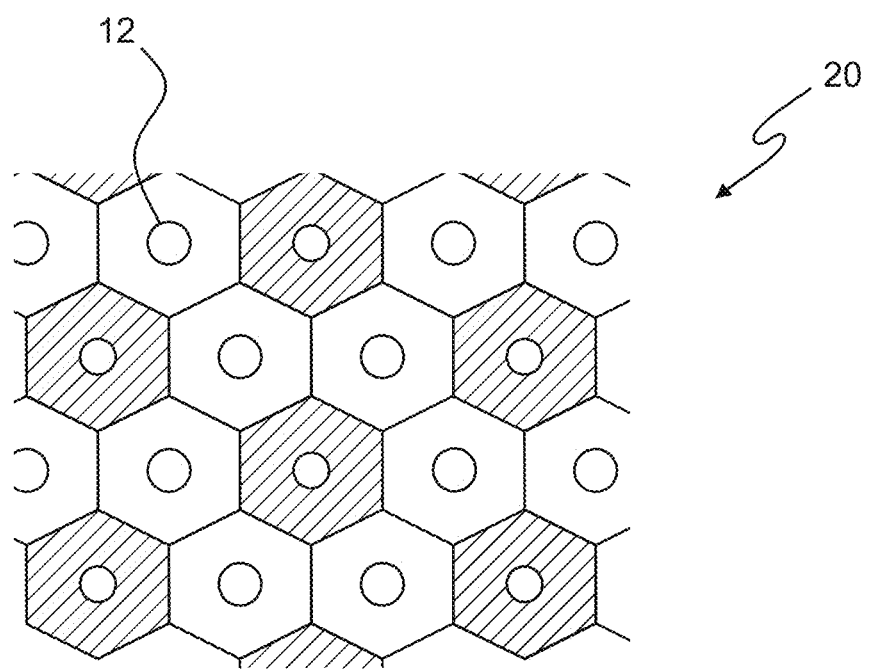
FIG. 5 is a plan view of a color mosaic point light source array with a first arrangement of point light sources.

FIG. 5 shows a plan view of a point light source array 20 of an interferometer according to the invention. The point light source array 20 is characterized in that the point light sources 12 are arranged such that each point light source 12 is arranged in the center of an imaginary regular hexagon, wherein the hexagons are adjacent to each other in one plane without gaps, and wherein hexagons, in the center of which a point light source 12 is arranged which emits light with a central wavelength, is only adjacent to hexagons in the center of which a point light source emitting light of another wavelength is arranged. Point light sources that emit light of the same wavelength are represented by the same shading of their associated hexagons. This makes it possible to reduce the required number of illumination configurations to three.

The different wavelengths can be in mutually different regions of a color spectrum of visible light or adjacent spectral ranges (near infrared or ultraviolet), such that the central wavelengths represent light of different colors. This applies to all examples of embodiments, and therefore generally for the interferometer according to the invention.

In this arrangement in which the point light sources are arranged on a two-dimensional grid with hexagonal unit cells, three light sources of different wavelengths are sufficient to comply with the condition that neighbors must be of different colors, while completely illuminating the test object. If red (e.g., 630-690 nm), green (e.g., 532 nm) and blue light (e.g., 440-460 nm) are used, all three illumination configurations can be registered in only one image capture, assuming that RGB color cameras are used as the image capture device K—for example, cameras with Bayer filter arrays before the camera pixels. The point light source array 20 may also be referred to as a color mosaic point light source array.

Figure 6:
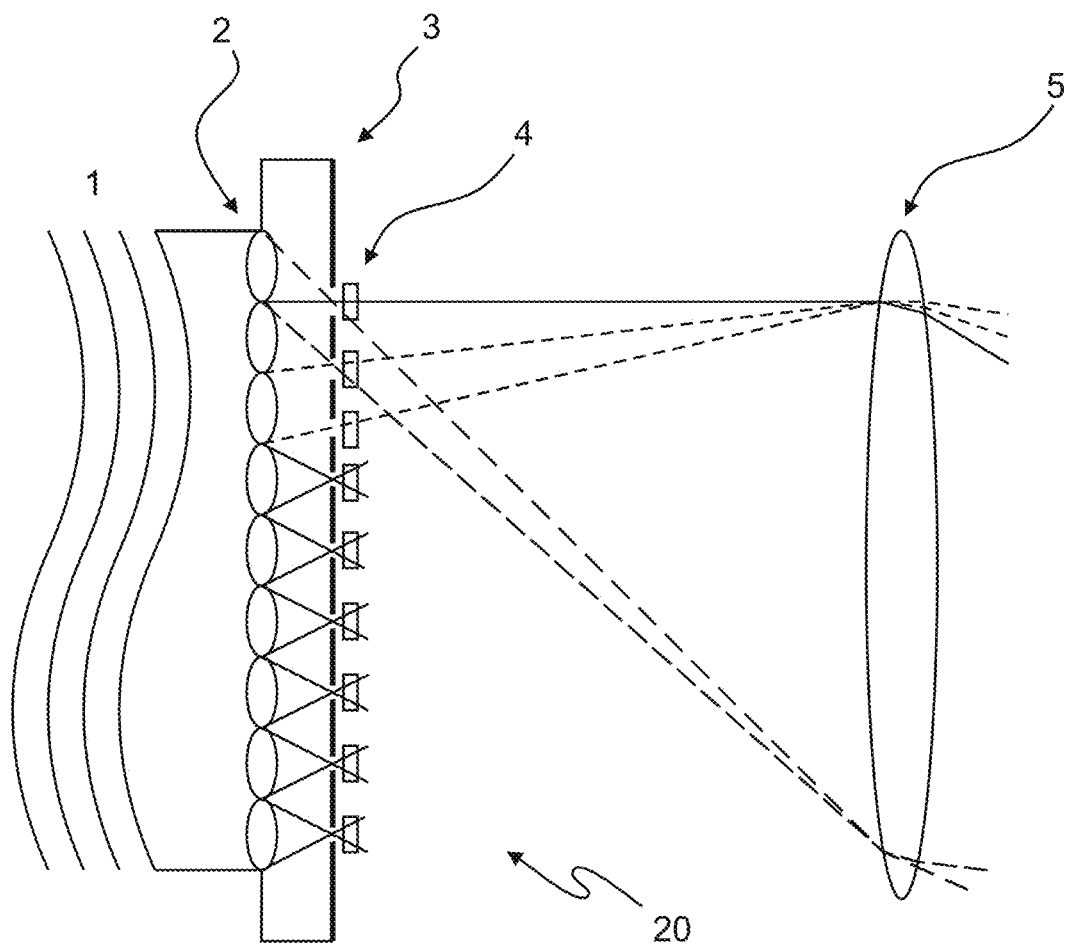
FIG. 6 shows a side view of a color mosaic point light source array.

FIG. 6 shows a side view of a color mosaic point light source array 20. The color mosaic point light source array generates punctiform light sources with only one central wavelength. These are converted by the collimating lens 5 into approximately planar wavefronts tilted relative to one another. The color mosaic point light source array consists of a micro-lens array 2 which focuses the arriving light onto an aperture array 3, and an optional filter array 4 which allows only light of one of the n wavelengths to pass per micro-lens. For each micro-lens, only one of the n wavelengths is ideally focused in the aperture plane. In the context of the preferred embodiments, n=three or four. N=3 in the case of the color mosaic point light source array shown in FIG. 5. Accordingly, the color mosaic point light source array generates a plurality of point light sources from n arriving illumination light wavefronts of different wavelengths.

Figure 7:
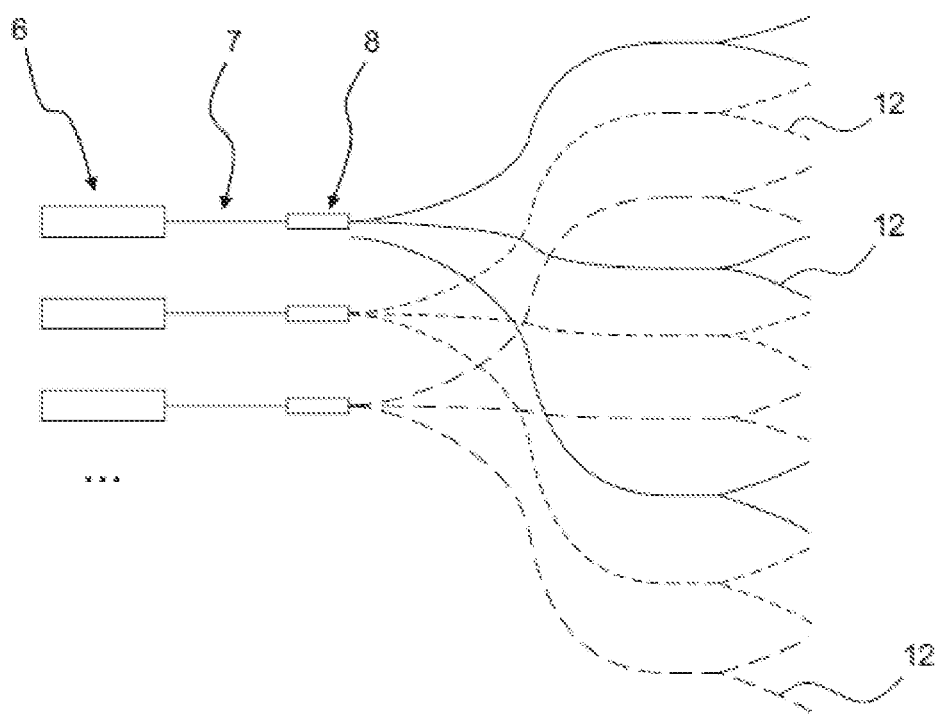
FIG. 7 is a side view of an alternative point light source array based on optical fibers.
Figure 8:
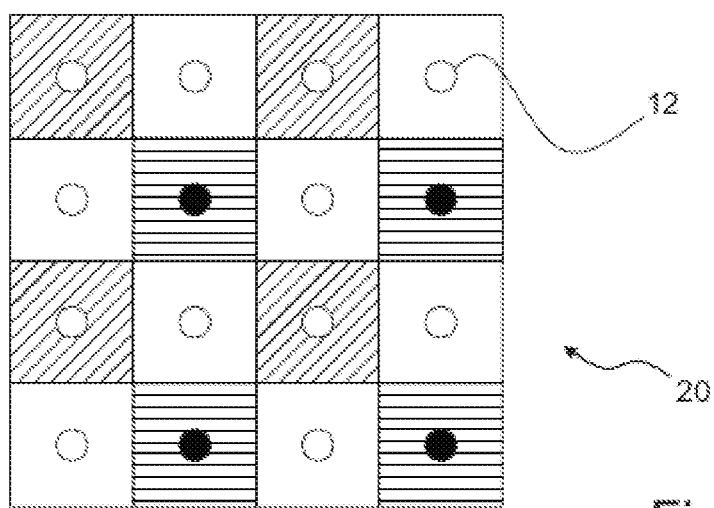
FIG. 8 is a plan view of a color mosaic point light source array with a second arrangement of point light sources.

As an alternative to the micro-lens-based color mosaic point light source array 20 of FIG. 5, an array of optical fibers which is fed by n=3 or 4 or even more light sources of different wavelengths can also be used. FIG. 7 shows a point light source array based on optical fibers. Light from n=3 lasers 6 of different wavelengths is coupled into an optical fiber 7, which is divided into m fibers at a 1/m coupler 8. The light exit ends of the fibers 6 form point light sources and are arranged as shown in FIGS. 5 and 8. Here too, point light sources which emit light of the same wavelength are represented by the same symbols. FIG. 7 thus shows an embodiment in which the plurality of point light sources 12 for each central wavelength has an arrangement of optical fiber ends which is coupled by an optical coupler 8 to a laser source 6 emitting light of the central wavelength.

Each set of point light sources 12 coupled to one of the lasers 6 forms an illumination configuration. The condition that the interferogram patches do not overlap can nevertheless be maintained by the arrangement according to FIG. 5 in conjunction with the three illumination configurations. The parallel capture of these three illumination configurations in only one capture is successful because the three illumination configurations are simultaneously activated and the test object is thus simultaneously illuminated with wavelengths (or color channels) which are specific to the respective illumination configurations, and the image capture is spectrally filtered.

The superimposed but color-differentiable interferogram patches 18 can thus be separated again on the image capture device K, for example by local color filters before each pixel.

As an advantageous result, all three/four illumination configurations can be registered in only one image capture.

The phase evaluation can traditionally take place via phase shifters; however, this requires the capture of, for example, five individual images which can be captured in a rapid sequence, such that a typical measurement time of approximately one second can be realized.

Another implementation uses the previous illumination arrangement in which the point light sources are arranged on a two-dimensional grid with a square unit cell. However, this requires four light sources of different wavelengths (or four color channels). In this case, the color/wavelength channels on the image capture device can also be separated by filter arrays in front of the image capture device pixels. In this case, the filter arrays are designed such that primarily only one wavelength is transmitted by the filters per pixel, while the others are blocked.

FIG. 8 shows a color mosaic point light source array in which the point light sources are arranged in such a way that each light source is arranged in the center of an imaginary regular square, wherein the squares are adjacent to one another without gaps in one plane, and wherein squares, in the center of which a light source is arranged, which emits light with a central wavelength (i.e., light of one color channel), is only adjacent to squares in the center of which a light source emitting light of a different wavelength (i.e., light of another color channel) is arranged. Point light sources 12 which emit light of the same wavelength are represented by the same hatching of their associated squares. This embodiment accordingly works with four illumination configurations and/or color channels.

Beyond the mentioned regular arrangements, the illumination configurations can also be used with an irregular arrangement of point light sources—as long as it is ensured that no two adjacent point light sources use the same wavelength. For some test configurations, it is advantageous to position the point light sources such that they do not lie in a planar surface, but rather, for example, on a curved surface, or on a conical, cylindrical or pyramidal surface.

A capture of the test object form in only one camera image is realized with the invention as follows: The light reflected or transmitted by the test object SUT (test waves, or object waves reflected or transmitted by the test object SUT) is modified by corresponding polarizers and phase delay plates in such a way that circularly polarized light falls onto the image capture device K.

The reference wavefront necessary for the interferences is modified in such a way that circularly polarized light falls onto the image capture device K. The relative phase between the object wave and the reference wave is varied by polarizers of different orientation before the pixels of the image capture device K, such that the phase being measured can be determined using conventional phase shift algorithms.

Technically, the invention can be implemented very compactly by the use of color sensors from Sony that have been available for several months, which, in addition to the color filters, additionally have polarization filters of different orientation on the individual pixels of an image capture device.

Alternatively, instead of the polarization-based evaluation of the phase, carrier-frequency-based methods for evaluating the phase can also be used (see [Mitsuo Takeda, Hideki Ina, and Seiji Kobayashi, "Fourier-transform method of fringe-pattern analysis for computer-based topography and interferometry," J. Opt. Soc. Am. 72, 156-160 (1982)]).

The invention is not limited to the interferometer described here as an application example, and can also be used, for example, in conjunction with a tilted wave interferometer of the Fizeau type, the Michelson type or the Mach-Zehnder type.

Figure 9:
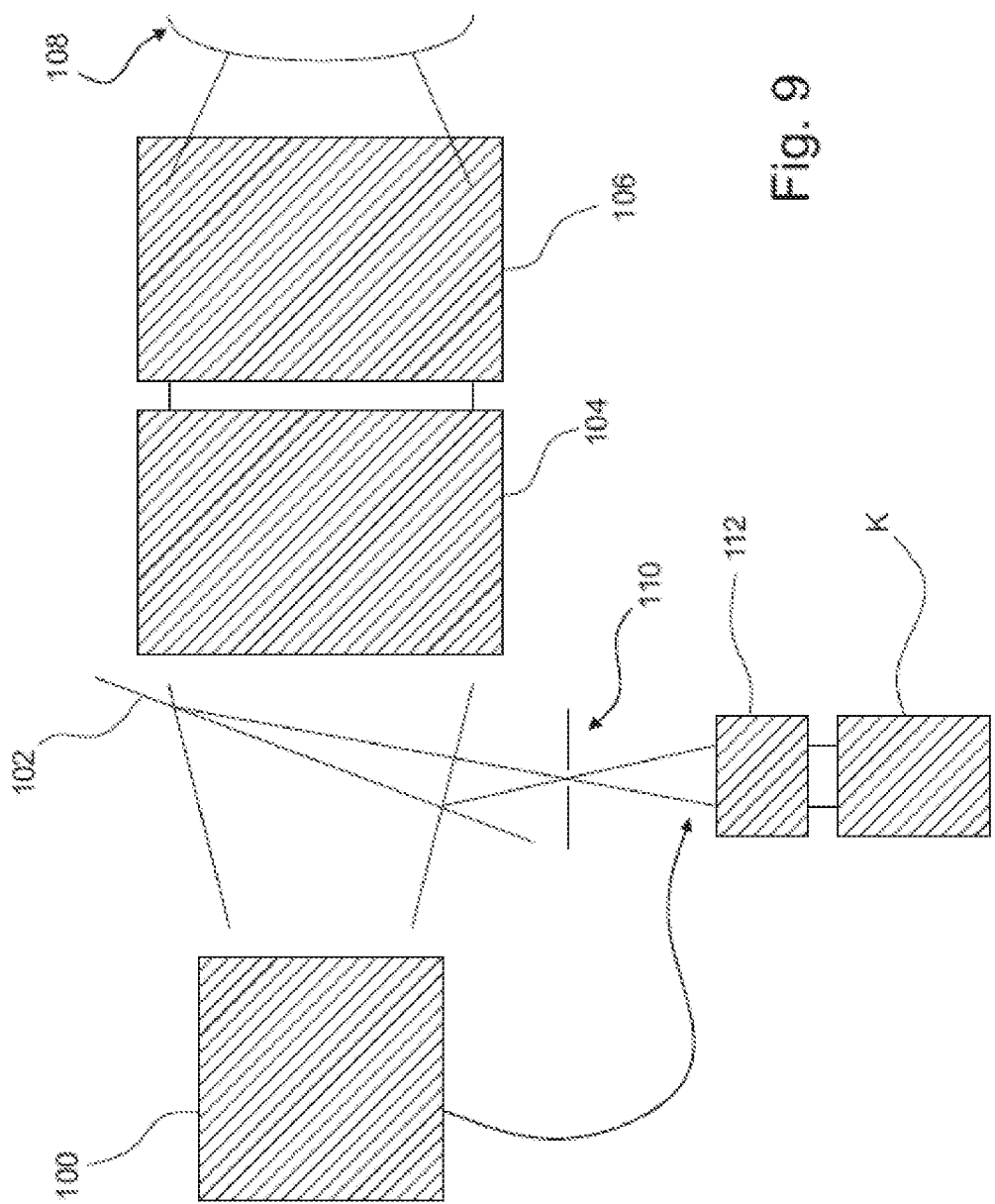
FIG. 9 shows a Twyman-Green tilted wave interferometer.

FIG. 9 schematically shows a Twyman-Green interferometer having an illumination unit 100, a beam splitter 102, a collimating lens 104, an interferometer objective 106, a test object surface 108, an interferometer aperture 110, an imaging lens 112 and an image capture device K.

Figure 10:
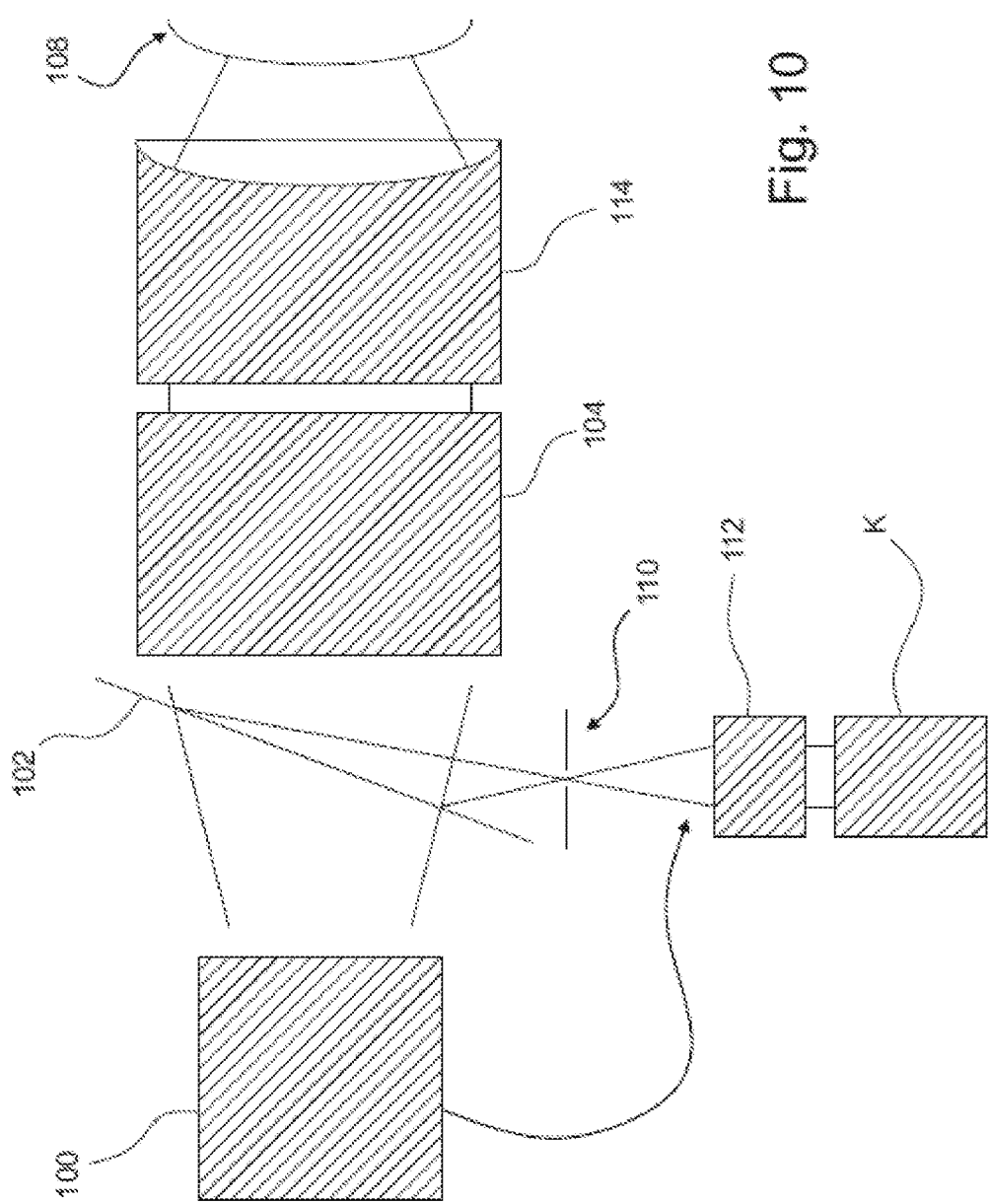
FIG. 10 shows a Fizeau tilted wave interferometer.

FIG. 10 schematically shows a Fizeau tilted-wave interferometer having an illumination unit 100, a beam splitter 102, a collimating lens 104, a Fizeau interferometer objective 114, a test object surface 108, an interferometer aperture 110, an imaging lens 112 and an image capture device K.

Figure 11:
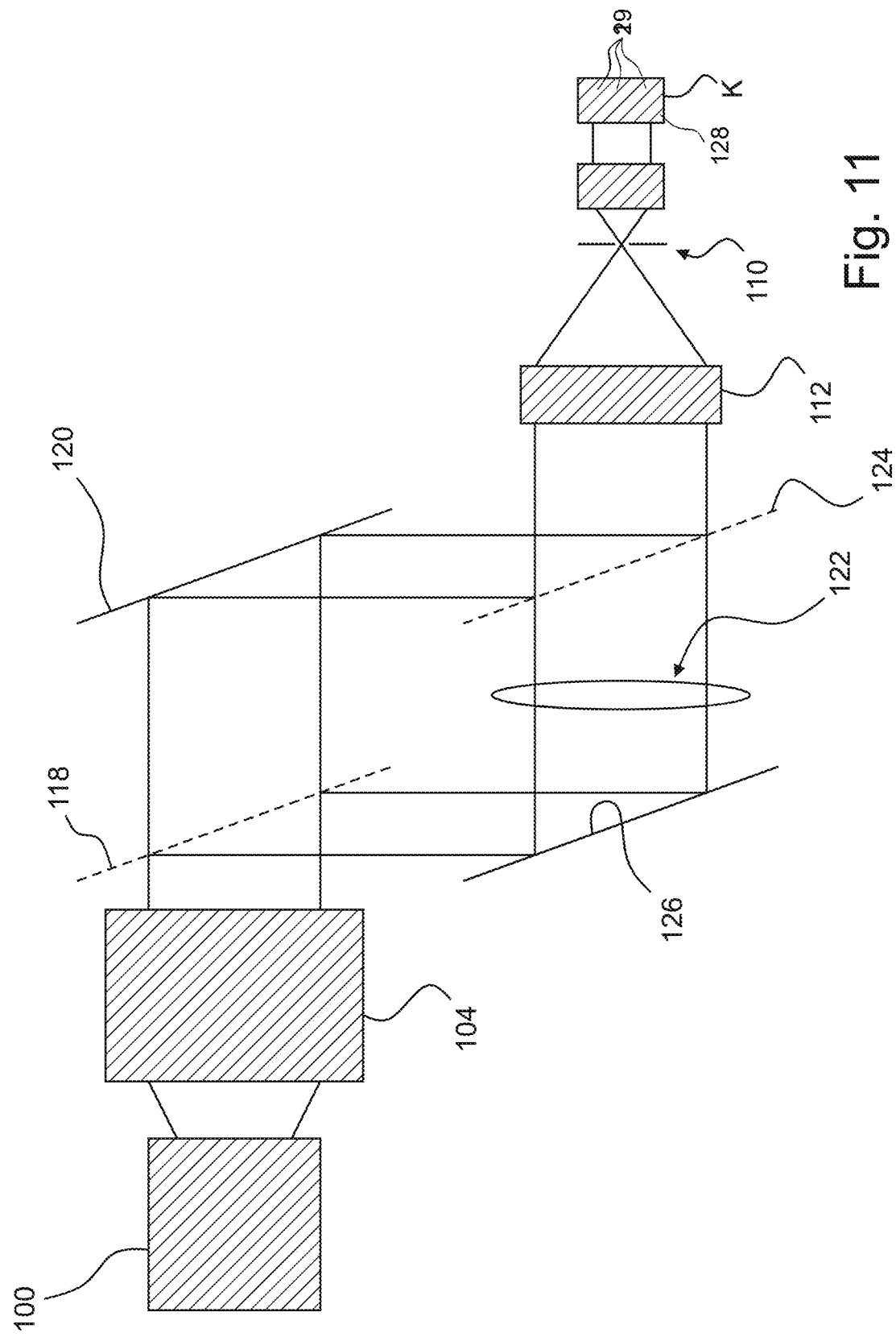
FIG. 11 shows a Mach-Zehnder type interferometer.

The interferometers described here are operated with light reflected off the test object. FIG. 11 shows an interferometer of the Mach-Zehnder type, operated using light transmitted by the test object, having an illumination unit 100, a collimating lens 104, a first beam splitter 118, a first mirror 120, a test object 122 which transmits light, a second beam splitter 124, an imaging lens of an interferometer aperture, and an image capture device, as well as a second mirror 126 in the reference beam path.

Depending on the interferometer type, the light of an illumination unit 100 generating the required light waves arrives on different paths at the transmitting test object 122 and/or at a reflecting test object surface 108. The illumination unit 100 is, for example, a color mosaic point light source array 20 as described further above. There, the light interacts with the test object 122/the test object surface 108, and accordingly carries the desired information. For example, a structure of the Twyman-Green type or Fizeau type can be selected if the surface topography of the test object surface is being measured, or a structure of the Mach-Zehnder type is selected—and the test object is used for transmission—if the variable being measured is its optical thickness. Following interaction with the test object, the test wavefronts of different wavelengths resulting from the interaction reach the image capture device K including one or more color filters 128 and polarization filters 129, where they are superimposed on the respective coherent reference wavefronts. By using light of different wavelengths, all point light sources can simultaneously emit light during an exposure of the image capture device for at least a portion of the exposure time. Since all point light sources are simultaneously switched on, the measurement information arises at the same time in an image capture over the entire test object.

The spectral separation of the interferograms resulting from the superposition on the image capture device K can be realized via various technical implementations. In addition to the filter masks already mentioned above before the pixels of an image capture device, the spectral channels can be realized by separate cameras/image capture devices for each color or central wavelength. In this case, the light from the test object is distributed by beam splitters onto the different image capture devices, and either spectrally selected at the beam splitters by dichroic beam splitter layers, or spectrally selected by absorbing filters directly in front of the image capture devices.

The interferogram patches separated by the color filters first show sinusoidal intensity bands, from which the phase difference and thus the path difference between reference and object wave, from which the test object properties being measured are determined, are calculated during the phase evaluation.

According to the prior art, the phase evaluation can take place by means of temporal phase shifters, that is to say by means of a capture of a sequence of interferograms, in which a change in the phase between the object and reference wave is selectively inserted between the captures, typically by the displacement of a mirror in the beam path. This requires the capture of, for example, five individual images which can be captured in a rapid sequence, such that a typical measurement time of approximately one second can be realized.

A capture of the test object form in only one image capture is realized with the invention as follows:

The spectrally superimposed interferograms of the three or more illumination configurations are preferably split by spectral selection into individual interferograms, wherein each individual interferogram corresponds to one illumination configuration. These individual interferograms are each evaluated by methods for individual interferogram evaluation. A preferred embodiment of the individual interferogram evaluation is the evaluation via polarization methods (e.g., U.S. Pat. Nos. 7,777,895, 6,304,330, 6,552,808, 7,230, 717). In this case, the light from the test object is modified by polarizers and phase delay plates in such a way that circularly polarized light falls onto the image capture device. The reference wavefront necessary for the interferences is modified in such a way that oppositely circularly polarized light falls on the image capture device. The relative phase between the object wave and reference wave is varied by polarizers of different orientations before the pixels of the image capture device, such that the phase being measured from a group of four pixels can be determined using conventional phase shift algorithms.

Technically, the invention can be implemented very compactly by the use of the polarization image sensors available now for several months from Sony, which in addition to the color filters additionally have polarization filters with four different orientations on the individual pixels, wherein the polarization filters are arranged between a photodiode layer and a lens layer of the image capture device chip.

In a further preferred embodiment, the phase of the individual interferograms is determined by carrier frequency methods—see for example [Mitsuo Takeda, Hideki Ina, and Seiji Kobayashi, "Fourier-transform method of fringe-pattern analysis for computer-based topography and interferometry," J. Opt. Soc. Am. 72, 156-160 (1982)]. In this case, the object waves are superimposed on reference waves that are strongly tilted relative to the object waves. The phase evaluation then takes place by demodulation methods from the high-frequency interferogram bands.

Figure 12:
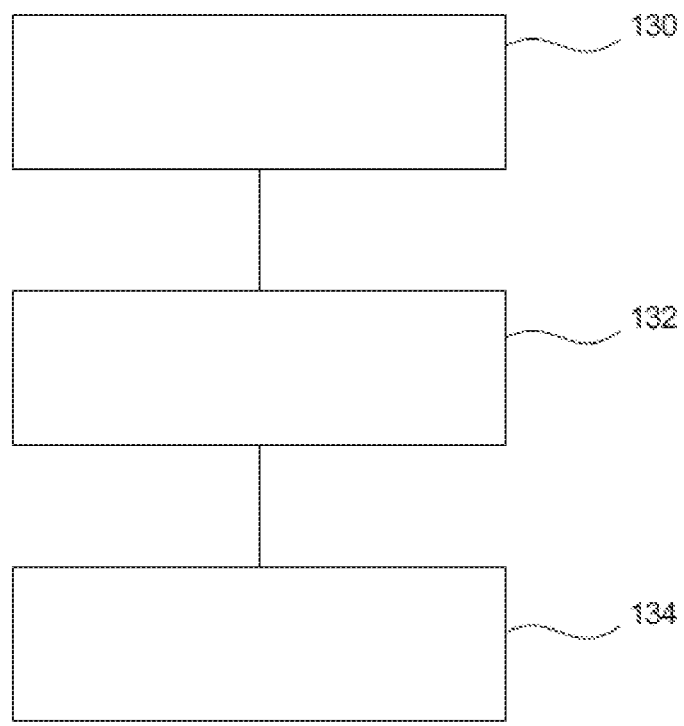
FIG. 12 shows a flow chart as an example of an embodiment of a method according to the invention.

FIG. 12 shows a flow chart as an example of an embodiment of a method according to the invention for the measurement of a surface or optical thickness of an optically smooth test object.

In a first step 130, the optically smooth test object is illuminated with a plurality of object waves from discretely different directions. In this case, a first of the object waves, arriving from a first direction, has a first central wavelength. A second of the object waves propagating in a second of the discretely different directions has a second central wavelength, and a third of the object waves propagating in a third of the discretely different directions has a third central wavelength. The first central wavelength is different from the second central wavelength, and the third central wavelength is different from the first central wavelength and from the second central wavelength. The test object is illuminated simultaneously with the first object wave and the second object wave and the third object wave. Following an interaction with the test object, object waves originating therefrom are superimposed on the image capture device in a step 132. In a third step 134, the interferograms produced by the superposition are spectrally decomposed into wavelength-specific partial interferograms.

In a preferred embodiment, the interferometer 10 is configured to illuminate the optically smooth test object with a plurality of illumination configurations, wherein each illumination configuration results from a plurality of object waves with which the test object is illuminated, and to superimpose object waves influenced by the test object by means of reflection on the surface 108 being measured or by means of transmission through the test object 122 onto reference waves coherent with the object waves on at least one image capture device K, to produce interferograms. In this case, each illumination configuration is realized by a separate color channel and/or a separate central wavelength, wherein a first of the illumination configurations has only object waves 14.1, 14.2, 14.3 which have a first central wavelength, and wherein a second of the illumination configurations 14.1, 14.2, 14.3 has only object waves which have a second central wavelength, wherein a third of the illumination configurations has only object waves 14.1, 14.2, 14.3, which have a third central wavelength, wherein the first central wavelength is different from the second central wavelength, wherein the third central wavelength is different from the first central wavelength and from the second central wavelength, and wherein the interferometer 10 is configured to illuminate the test object 122 simultaneously with object waves of the first illumination configuration and the second illumination configuration and the third illumination configuration from discretely different directions, and, following an interaction with the test object 122, to superimpose object waves returning therefrom on the image capture device K, and wherein the image capture device K is configured to spectrally decompose the interferograms produced by the superposition into wavelength-specific partial interferograms.

It is also preferred that a fourth of the illumination configurations has only object waves having a fourth central wavelength, and that the fourth central wavelength is different from the first central wavelength and from the second central wavelength and from the third central wavelength.

It is further preferred that object waves propagating in closest adjacent directions do not have the same central wavelength.

A further preferred embodiment is characterized in that the image capture device K is configured to separate interferograms by color filters in such a manner that each pixel of the image capture device K only detects the interferogram information of only one wavelength.

It is also preferred that the interferometer has a plurality of point light sources 12 from which the object waves of an illumination configuration are emitted simultaneously.

It is further preferred that the point light sources 12 are arranged in such a manner that each point light source 12 is arranged in the center of an imaginary regular hexagon, wherein the hexagons are adjacent to each other without gaps in one plane, and in such a way that hexagons, in the center of which a point light source 12 is arranged which emits light of a central wavelength, is only adjacent to hexagons in the center of which a point light source 12 emitting light of another wavelength is arranged.

A further preferred embodiment is characterized in that the point light sources 12 are arranged in such a way that each point light source 12 is arranged in the center of an imaginary regular square, wherein the squares are adjacent to one another without gaps in one plane, and squares, in the center of which a point light source 12 is arranged which emits light with a central wavelength, is only adjacent to squares in the center of which a point light source 12 emitting light of another wavelength is arranged.

It is also preferred that the image capture device K, in addition to color filters, additionally has polarization filters on its individual pixels, with pixel-wise different orientations.

Furthermore, it is preferred that the plurality of point light sources 12 for each central wavelength is an arrangement of a coherent laser source L, a Keplerian telescope, and a point light source array PLQA, which consists of a transparent substrate, wherein there are micro-lenses on the light entry side thereof facing the telescope, and the focal point thereof is in the plane of a light exit side of the substrate, where an aperture array AA is located, from which the object waves of a central wavelength are emitted.

A further preferred embodiment includes the plurality of point light sources 12 for each central wavelength having an arrangement of optical fiber ends which is coupled by means of one or more optical couplers 8 to a laser source 6 emitting light of the central wavelength.

In a preferred embodiment of the method, the optically smooth test object 122 is illuminated with a plurality of illumination configurations 14.1, 14.2, 14.3, wherein each illumination configuration results from a plurality of object waves with which the test object is illuminated. Object waves influenced by the test object 122 by means of reflection on the surface 108 being measured or by means of transmission through the test object 122 are superimposed on reference waves coherent with the object waves on at least one image capture device K, to produce interferograms. Each illumination configuration is realized by a separate color channel and/or a separate central wavelength, wherein a first of the illumination configurations has only object waves 14.1, 14.2, 14.3 which have a first central wavelength, and wherein a second of the illumination configurations 14.1, 14.2, 14.3 has only object waves which have a second central wavelength, wherein a third of the illumination configurations has only object waves 14.1, 14.2, 14.3, which have a third central wavelength, wherein the first central wavelength is different from the second central wavelength, wherein the third central wavelength is different from the first central wavelength and from the second central wavelength, and wherein the test object 122 is simultaneously illuminated with object waves of the first illumination configuration and the second illumination configuration and the third illumination configuration from discretely different directions, and, following an interaction with the test object 122, object waves returning therefrom are superimposed on the image capture device K, and wherein the image capture device K is configured to spectrally decompose the interferograms produced by the superposition into wavelength-specific partial interferograms.

What is claimed is:

1. An interferometer for the areal measurement of a surface or an optical thickness of an optically smooth test object, wherein the interferometer is configured to:
    illuminate the optically smooth test object with a plurality of illumination configurations, wherein each illumination configuration is produced by a plurality of object waves with which the test object is illuminated; and
    superimpose object waves influenced by the test object by means of reflection on the surface being measured or by means of transmission through the test object onto reference waves coherent with the object waves on at least one image capture device (K), to produce interferograms,
    wherein each illumination configuration is realized by object waves having wavelengths of a continuous wavelength region with a central wavelength which is specific to the wavelength region,
    wherein a first of the illumination configurations has only object waves of a wavelength region having a first central wavelength,
    wherein a second of the illumination configurations has only object waves of a wavelength region having a second central wavelength,
    wherein a third of the illumination configurations has only object waves of a wavelength region having a third central wavelength,
    wherein the first central wavelength is different from the second central wavelength,
    wherein the third central wavelength is different from the first central wavelength and from the second central wavelength,
    wherein object waves which propagate in closest adjacent directions do not contain wavelengths of the same wavelength region,
    wherein the interferometer is configured to illuminate the test object simultaneously with object waves of the first illumination configuration, the second illumination configuration and the third illumination configuration from discretely different directions, and, following an interaction with the test object, to superimpose object waves returning therefrom on the image capture device, and
    wherein the image capture device is configured to spectrally decompose the interferograms produced by the superposition into wavelength-specific partial interferograms.

2. The interferometer according to claim 1, wherein:
    a fourth of the illumination configurations has only object waves of a wavelength region which has a fourth central wavelength;
    the fourth central wavelength is different from the first central wavelength, the second central wavelength and the third central wavelength;
    the interferometer is configured to illuminate the test object simultaneously with object waves of the first illumination configuration, the second illumination configuration, the third illumination configuration and the fourth illumination configuration from discretely different directions and, following an interaction with the test object, to superimpose object waves returning therefrom on the image capture device; and
    the image capture device is configured to spectrally decompose the interferograms produced by the superposition into wavelength-specific partial interferograms.

3. The interferometer according to claim 1, wherein the interferometer has a plurality of point light sources from which the object waves of an illumination configuration are emitted simultaneously.

4. The interferometer according to claim 3, wherein:
    the point light sources are arranged in such a manner that each point light source is arranged in the center of an imaginary regular hexagon; and
    the hexagons are adjacent to each other without gaps in one plane, and in such a way that hexagons, in the center of which a point light source is arranged which emits light with wavelengths of one of the wavelength regions with a central wavelength, is only adjacent to hexagons in the center of which a point light source which emits light of a wavelength of another of the wavelength regions.

5. The interferometer according to claim 3, wherein:
the point light sources are arranged in such a manner that each point light source is arranged in the center of an imaginary regular square;
the squares are adjacent to one another without gaps in one plane; and
squares, in the center of which a point light source is arranged which emits light with wavelengths of one of the wavelength regions which has a central wavelength, is only adjacent to squares in the center of which a point light source is arranged which emits light of a wavelength of another of the wavelength regions.

6. The interferometer according to claim 3, wherein:
the plurality of point light sources for each of the wavelength regions is an arrangement of a coherent laser source, a Keplerian telescope, and a point light source array which consists of a transparent substrate; and
micro-lenses are arranged on the light entry side thereof facing the telescope, and the focal point thereof is in the plane of a light exit side of the substrate, where an aperture array is located, from which the object waves of one of the wavelength regions are emitted.

7. The interferometer according to claim 3, wherein the plurality of point light sources for each of the wavelength regions has an arrangement of optical fiber ends coupled by means of one or more optical couplers to a laser source emitting light of the central wavelength.

8. The interferometer according to claim 1, wherein the image capture device is configured to separate interferograms using color filters, in such a manner that each pixel of the image capture device detects only the interferogram information of only one wavelength region.

9. The interferometer according to claim 8, wherein the image capture device, in addition to color filters, additionally has polarization filters on its individual pixels, with pixel-wise different orientations.

10. A method for the areal measurement of a surface or an optical thickness of an optically smooth test object,
illuminating the optically smooth test object with a plurality of illumination configurations, wherein each illumination configuration is made up of a plurality of object waves with which the test object is illuminated and which are emitted by the plurality of point light sources; and
superimposing object waves influenced by the test object by means of reflection on the surface being measured or by means of transmission through the test object onto reference waves coherent with the object waves on at least one image capture device, to produce interferograms,
wherein each illumination configuration is realized by means of object waves with wavelengths of a continuous wavelength region which has a central wavelength which is specific to the wavelength region,
wherein a first of the illumination configurations has only object waves of a wavelength region which has a first central wavelength,
wherein a second of the illumination configurations has only object of a wavelength region which has a second central wavelength,
wherein a third of the illumination configurations has only object waves of a wavelength region which has a third central wavelength,
wherein the first central wavelength is different from the second central wavelength,
wherein the third central wavelength is different from the first central wavelength and from the second central wavelength,
wherein object waves which are emitted by two closest adjacent point light sources do not contain wavelengths of the same wavelength region,
wherein the test object is simultaneously illuminated with object waves of the first illumination configuration, the second illumination configuration and the third illumination configuration from discretely different directions, and, following an interaction with the test object, object waves returning therefrom are superimposed on the image capture device, and
wherein the interferograms produced by the superposition are spectrally decomposed into wavelength-specific partial interferograms.

\* \* \* \* \*